Oct. 5, 1937.  J. S. LOCKE  2,094,992
HEATING SYSTEM
Filed May 23, 1935  2 Sheets-Sheet 1

Fig.1

Inventor
James S. Locke
George H Fisher
By
Attorney

Fig. 2

Patented Oct. 5, 1937

2,094,992

UNITED STATES PATENT OFFICE 2,094,992

HEATING SYSTEM

James S. Locke, Minneapolis, Minn., assignor to Minneapolis-Honeywell Regulator Company, Minneapolis, Minn., a corporation of Delaware Application May 23, 1935, Serial No. 23,005

17 Claims. (Cl. 236—46)

This invention relates to heating systems of the type disclosed in the application of Daniel G. Taylor, Serial No. 512,885, filed February 2, 1931.

The system disclosed in the above referred to Taylor application comprises an outdoor controller responsive to outdoor atmospheric conditions including temperature, wind, and sun for controlling the temperature within the building. Heating means are provided in the building for supplying heat to the building and heating means are also provided in the outdoor controller for supplying heat to the outdoor controller. The two heating means are proportioned according to the heat losses from the building and from the outdoor controller. A thermostatic device is provided for responding to the temperature within the outdoor controller and when this thermostatic device calls for heat both of the heating means are energized to deliver heat to the building and to the outside controller. Due to the proportional relationship of the heating means with the heat losses of the building and the outside controller, a definite temperature relation is maintained within the building and the outside controller so that by responding to the temperature of the outside controller, the thermostatic device maintains a constant or normal temperature within the building.

Such a system gives especially good results when the system is maintained in operation for twenty-four hours a day. However, it is often desirable to shut down the heating system during the night to lower the temperature within the building to conserve on fuel costs. But due to the fundamental theory of operation, the system of the Taylor application cannot supply sufficient heat to the building in the morning after a night shut down to rapidly raise the temperature to normal and thereafter maintain the temperature in the building at normal. This is caused by the fact that only sufficient heat is supplied to the building to maintain the temperature thereof constant according to variations in outside atmospheric conditions. In order to successfully operate the system of the type disclosed in the above referred to Taylor application where it is desired to have a night shut down, it is necessary that some means be provided for raising the temperature in the building to normal after a night shut down.

Therefore, it is an object of this invention to provide a morning pick-up control of the heating system whereby the building temperature is brought up to normal so that the temperature of the building may be maintained at normal by the outdoor controller.

More specifically, it is an object of this invention to provide a morning pick-up control of the heating system whereby the building temperature is brought up to normal in accordance with outdoor atmospheric conditions and to provide a normal day control of the heating system whereby the building temperature is maintained at normal in accordance with outdoor atmospheric conditions.

It is another object of this invention to provide a heating system of the class described with a means whereby the temperature of the building may be restored to normal at a definite time each day regardless of the outdoor temperature conditions.

More specifically, it is an object of this invention to provide a means for placing a heating system in operation at a time in the morning which is dependent upon outdoor temperature conditions so that on cold mornings the heating system will be placed in operation before it would be on mild mornings.

Still another object of this invention is to provide a combined time and temperature responsive controller for placing a heating system in operation comprising a variable resistance that is varied by a timing motor at predetermined intervals, a variable resistance that is varied in accordance with outdoor temperature conditions and a coil operatively connected to both resistances whereby the building heating system is placed in operation at a time dependent on outdoor temperature conditions and also placed out of operation at a time dependent on outdoor temperature conditions.

It is an object of one form of my invention to provide a heating system having an outdoor controller for controlling the same with a means for supplying heating fluid to the building in the morning independent of the outdoor controller and the time that the heating fluid is so supplied being determined by the outdoor temperature conditions.

It is an object of another form of my invention to provide a heating system having an outdoor controller for controlling the same with a means for placing the outdoor controller in control of the heating system at a time dependent upon outdoor temperature conditions whereby the temperature of the building will be restored to normal at a given time each morning regardless of outdoor temperature conditions.

Other objects and advantages will become apparent to those skilled in the art upon referring to the accompanying specification, claims and drawings, in which drawings:

Figure 1:
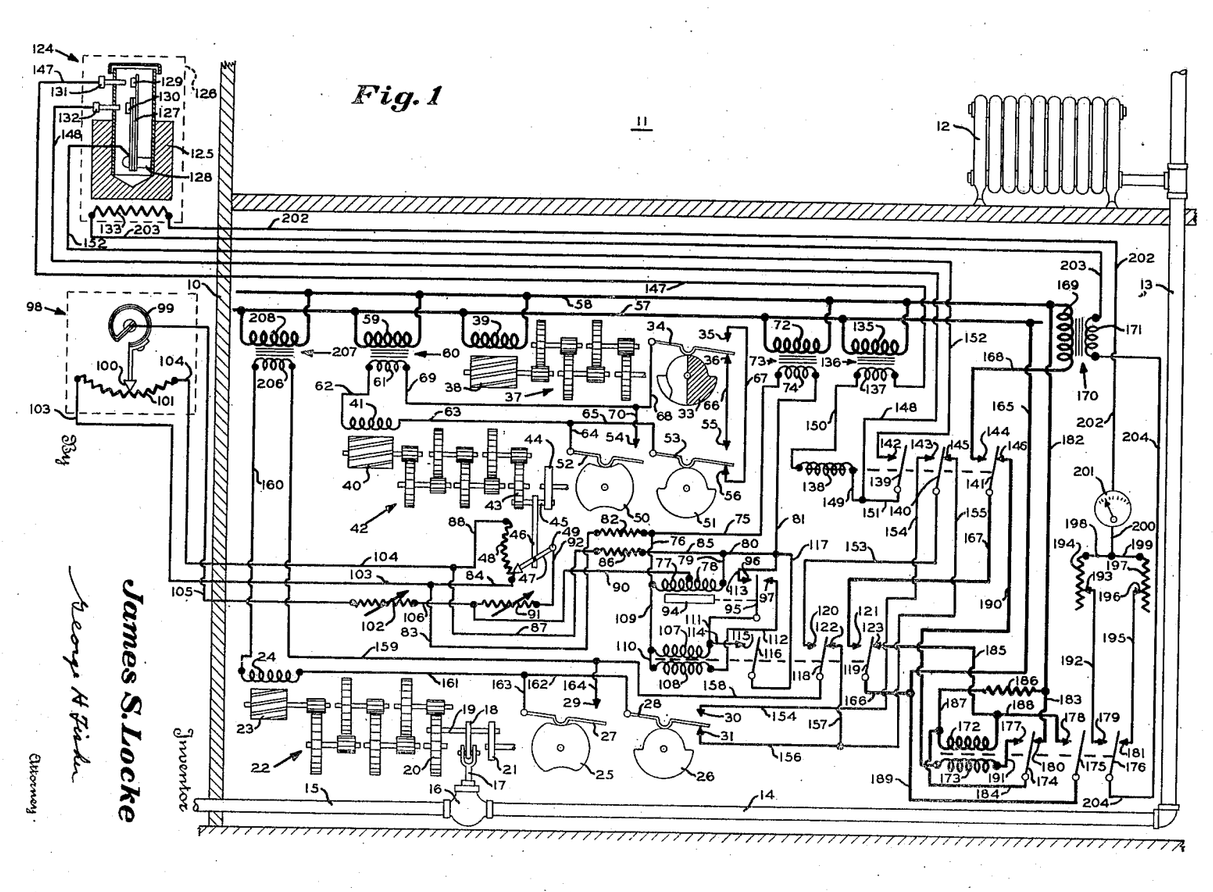
Fig. 1 is a diagrammatic illustration of one form of my invention wherein the morning pick-up and the normal day operation is controlled by an outdoor controller and wherein the time of the beginning of the morning pick-up is determined by another outdoor controller.

My invention is shown in Fig. 1 to be applied to a building having a side wall 10 and a plurality of rooms or spaces to be heated, one of which is shown at 11. In each room or space to be heated 11 is a radiator 12 which receives its supply of heating fluid, such as steam from a riser 13. The riser 13 is connected to a pipe 14 which receives its supply of heating fluid from a supply pipe 15 emanating from some source of heating fluid such as a central heating plant or a constantly energized boiler (not shown). A valve 16 controls the supply of heating fluid from the supply pipe 15 into the pipe 14 in such a manner that when the valve 16 is opened heating fluid is supplied to the radiators and when the valve 16 is closed the supply of heating fluid to the radiators is prevented.

The valve 16 is operated by means of a valve stem 17 which is connected to a pitman 18 journalled on a crank pin 19. The crank pin 19 is carried by a gear 20 and a crank disc 21. The gear 20 is driven through a reduction gear train 22 by a motor rotor 23 upon energization of a field 24. The cank disc 21 drives cams 25 and 26 which in turn operate contact arms 27 and 28, respectively. When the high dwells of the cam 25 engage the contact arm 27, the contact arm 27 is moved into engagement with a contact 29. Likewise, when the high dwell of the cam 26 engages the contact arm 28, the contact arm 28 is moved into engagement with a contact 30 and when the low dwell of the cam 26 is engaged by the contact arm 28, the contact arm 28 engages a contact 31.

This invention contemplates the use of a time switch having a cam 33 operating a contact arm 34. When the high dwell of cam 33 engages the contact arm 34, the contact arm 34 is moved into engagement with a contact 35 and when the low dwell of cam 33 is engaged by the contact arm 34, the contact arm 34 engages a contact 36. The cam 33 is driven at such a speed as to make one revolution in twenty-four hours through a reduction gear train 37 by a motor rotor 38 upon energization of a motor field 39. For purposes of illustration one half of the cam 33 is shaded to designate the night portion of the cam and the other half is left unshaded to designate the day portion thereof. With the cam in the position shown in the drawings, it is seen that the time represented thereby is midnight. It is also seen that the contact arm 34 is moved into engagement with the contact 36 at substantially 6:00 o'clock in the evening and that the contact arm 34 is moved into engagement with the contact 35 at substantially 6:00 o'clock in the morning. The cam 33 is made adjustable so that any desired timing operation may be obtained.

A timing motor is diagrammatically shown in the drawings, having a rotor 40 which is rotated upon energization of a field 41. The rotor 40 drives a gear 43 through a reduction gear train 42. A crank pin 45 extends between the gear 43 and a crank disc 44. The crank pin 45 is connected by means of a pitman 46 or any other suitable structure with a slider 47 pivotally mounted at 49 and adapted to swing across a potentiometer coil 48. Upon one half of a revolution of the gear 43, the slider 47 is swept completely across the potentiometer coil 48. The crank disc 44 operates cams 50 and 51 which in turn operate contact arms 52 and 53 respectively. The high dwells of cam 50 move the contact arm 52 into engagement with a contact 54. The high dwell of the cam 51 moves the contact arm 53 into engagement with a contact 55 and the low dwell of cam 51 permits the contact arm 53 to engage the contact 56. The timing motor is so arranged that it takes substantially two and one half hours to move the slider 47 completely across the potentiometer coil 48.

Line wires leading from some source of power (not shown) are designated at 57 and 58. The field 39 of the time switch motor is connected across these line wires. A primary 59 of a stepdown transformer 60 having a secondary 61 is likewise connected across the line wires 57 and 58. A wire 62 connects one end of the secondary 61 with one end of the timing motor field 41. The other end of the field 41 is connected by means of wires 63 and 64 to the contact arm 52. The contact arm 53 is connected by a wire 65 to the junction of wires 63 and 64. The contacts 55 and 56 are connected by wires 66 and 67, respectively, to the contacts 36 and 35 of the time switch. The contact arm 34 of the time switch is connected by means of wires 68 and 69 to the other end of secondary 61. The contact 54 of the timing motor is connected by means of a wire 70 to the junction of wires 68 and 69.

With the parts in the position shown in the drawings, corresponding to midnight, the slider 47 is located at the bottom of the potentiometer coil 48. At 6:00 a. m. or thereabouts, in the morning, the contact arm 34 is moved into engagement with the contact 35 to complete a circuit from the secondary 61 through wires 69 and 68, contact arm 34, contact 35, wire 67, contact 56, contact arm 53, wires 65 and 63, field 41, and wire 62 back to the secondary 61 to energize the field 41 to start upward movement of the slider 47 with respect to the potentiometer coil 48. After this upward movement of the slider 47 has been started, the contact arm 52 is moved into engagement with the contact 54 to complete a maintaining circuit from the secondary 61 through wires 69 and 70, contact 54, contact arm 52, wires 64 and 63, field 41 and wire 62 back to the secondary 61. This maintaining circuit remains completed until the slider 47 reaches the upper extremity of the potentiometer coil 48 some two and one half hours hence. When the slider 47 reaches this position, the contact arm 52 is moved out of engagement with the contact 54 to break the maintaining circuit and the contact arm 53 is moved into engagement with the contact 55 to position the timing motor for downward operation of the slider 47 with respect to the potentiometer coil 48. At 6:00 o'clock in the evening, the contact arm 34 is moved into engagement with the contact 36 to complete a circuit from the secondary 61 through wires 69 and 68, contact arm 34, contact 36, wire 66, contact 55, contact arm 53, wires 65 and 63, field 41 and wire 62 back to the secondary 61 to energize the field 41 to start movement of the slider 48 from its upper extreme position to its lower extreme position. Complete movement of the slider 47 to its lower position is accomplished by the above referred to maintaining circuit. The slider 48 will reach its lowest position with respect to the potentiometer coil 48 some two and one-half hours after 6:00 o'clock in the evening. From this it is seen that I have provided a means for moving a slider in one direction across a potentiometer coil at a given time in the morning, for moving the slider in the opposite direction across the potentiometer coil at a given time in the evening and that the time of travel of the slider in either direction is substantially two and one-half hours.

A primary 72 of a step-down transformer 73 having a secondary 74 is connected across the line wires 57 and 58. One end of the secondary 74 is connected by means of wires 75 and 76 to one end of a double relay coil 77, 78. The other end of the double relay coil 77, 78 is connected by means of wires 79, 80, and 81 to the other end of the secondary 74. The junction of wires 75 and 76 is connected by means of a protective resistance 82 and wires 83 and 84 to the lower extremity of the potentiometer coil 48. The junction of wires 79 and 80 is connected by means of a wire 85, a protective resistance 86, and wires 87 and 88 to the upper extremity of the potentiometer coil 48. The middle of the double relay coil 77, 78 is connected by means of a wire 90, a variable resistance 91 and a wire 92 to the pivot 49 of the slider 47. The double relay coil 77, 78 operates an armature 94 which is operatively connected to a switch arm 95. When the coil 78 is energized more than the coil 77, the armature 94 is moved to the right to move the switch arm 95 into engagement with a contact 97. Likewise, when the coil 77 is energized more than the coil 78, the armature 94 is moved to the left to move the switch arm 95 into engagement with the contact 96. From the above it is seen that the bottom portion of the potentiometer coil 48 is connected in series with the coil 78 and the top portion of the potentiometer coil 48 is connected in series with the coil 77.

Located outside of the building to respond to outdoor temperature conditions is an outside controller 98 having mounted therein a thermostat 99. The thermostat 99 carries a slider 100 which is adapted to move across a potentiometer 101. One end of the potentiometer coil 101 is connected by a wire 103 to the junction of wires 83 and 84 and the other end of the potentiometer coil 101 is connected by means of a wire 104 to the junction of wires 87 and 88. The thermostat 99 is connected by means of a wire 105, a variable resistance 102, and a wire 106 to the junction of the wire 90 and the variable resistance 91. Therefore, the left hand and the right hand portions of the potentiometer coil 101 are connected in parallel with the lower and upper portions of the potentiometer coil 48. Upon an increase in temperature, the slider 100 is moved to the left along the potentiometer 101 and upon a decrease in temperature, the slider is moved to the right.

With the slider 100 in the mid-position corresponding to an average outdoor temperature and with the slider 47 in its lowest position corresponding to the night position, the coil 78 of the double relay coil 77, 78 is energized more than the coil 77 due to the series relationship of the potentiometer coil 48 and the coils 77 and 78 to attract the armature 94 to the right to move the switch arm 95 into engagement with the contact 97. At 6:00 in the morning, the time switch 34 places the timing motor 40 in operation and when the slider 47 reaches the midpoint of the potentiometer coil 48, the relay coils 77, 78 are equally energized to move the armature 94 to a mid-position to move the switch arm 95 out of engagement with the contact 97. Upon continued movement of the slider 47 beyond its mid-position, the relay coil 77 is energized more than the relay coil 78 to attract the armature 94 to the left to move the switch arm 95 into engagement with the contact 96. The switch arm 95 will remain in engagement with the contact 96 throughout the day until the time switch causes operation of the timing motor in the evening to move the slider 47 to the mid-position of the potentiometer coil 48 at which time the coils 77 and 78 will be equally energized to move the armature 94 to its mid-position and the switch arm 95 out of engagement with the contact 96. Upon further downward movement of the slider 47 beyond the mid-point of the potentiometer coil 48, the coil 78 is energized more than the coil 77 to move the contact arm 95 into engagement with the contact 97. The switch arm 95 will remain in engagement with the contact 97 through the night until the time switch comes into operation in the morning to again move the switch arm 95 into engagement with the contact 96 in the manner pointed out above.

The above operation of the switch arm 95 with respect to the contacts 96 and 97 was based on the assumption that the slider 100 of the outdoor controller 98 was located in a mid-position with respect to the potentiometer coil 101 due to the existence of an average outdoor temperature. Upon a decrease in outdoor temperature, the slider 100 moves to the right with respect to the potentiometer coil 101 to place more resistance in the left hand portion of the potentiometer coil 101 and less resistance in the right hand portion. Since the potentiometer coil 101 and the slider 100 are connected in parallel with the potentiometer coil 48 and the slider 47, some resistance is in effect added to the lower portion of the potentiometer coil 48 and some resistance is in effect taken away from the upper portion thereof. This moves the control point of the potentiometer coil 48 downwardly so that upon upward movement of the slider 47 in the morning equal energization of the coils 77 and 78 will occur before they would be equally energized if the slider 100 were at the mid-point of the potentiometer coil 101. Therefore, the switch arm 95 will be moved out of engagement with the contact 97 and into engagement with the contact 96 earlier in the morning for a lower outdoor temperature than for an average outdoor temperature. If the outdoor temperature should become extremely low so as to move the slider 100 completely to the right across the potentiometer coil 101, sufficient resistance would be added to the lower portion of the potentiometer coil 48 and sufficient resistance taken away from the upper portion thereof to immediately equalize the energizations of relay coils 77 and 78 upon a very slight upward movement of the slider 47 with respect to the potentiometer coil 48. Likewise, in the evening, when the timing motor causes downward movement of slider 47 with respect to the potentiometer coil 48, the balancing action of the relay coils 77, 78 to move the switch arm 95 out of engagement with the contact 96 and into engagement with the contact 97 will be delayed by a decrease in outdoor temperature since a decrease in outdoor temperature lowers the effective control point of the potentiometer coil 48.

Upon an increase in outside temperature above the average, the thermostat 99 moves the slider 100 to the left with respect to the potentiometer coil 101 to add resistance in effect to the upper portion of the potentiometer coil 48 and to take away resistance from the lower portion thereof. By adding resistance to the upper portion of the potentiometer coil 48 and taking resistance away from the lower portion, a greater upward movement of the slider 47 is required in the morning to balance the relay coils 77 and 78 to move the switch arm 95 out of engagement with the contact 97 and into engagement with the contact 96. Likewise, in the evening, an increase in outdoor temperature will cause earlier movement of switch arm 95 out of engagement with the contact 96 and into engagement with the contact 97 than would be the case when the outside temperature is normal. If the outdoor temperature should become sufficiently high so as to move the slider 100 to the extreme left hand extremity of the potentiometer coil 101, sufficient resistance would be thrown into the upper portion of the potentiometer coil 48 and sufficient resistance would be taken away from the lower portion thereof to require a substantially complete upward movement of the slider 47 with respect to the potentiometer coil 48 to equally energize the relay coils 77 and 78 and to move the switch arm 95 out of engagement with the contact 97 and into engagement with the contact 96. Likewise, upon downward movement of the slider 47 in the evening under the same conditions only a slight amount of movement thereof would be necessary to move the switch arm 95 out of engagement with the contact 96 and into engagement with the contact 97.

From the above it is seen that I have provided a timing mechanism that is compensated by outdoor atmospheric temperatures which requires substantially one hour and a quarter of operation to move a switch arm out of engagement with one contact and into engagement with another contact for average outdoor temperatures, that upon a decrease in outdoor temperatures the time interval required to so move the switch arm is proportionately decreased and that upon an increase in outdoor temperature, the time interval is proportionately increased. The same relation holds true for night operation but in the reverse order requiring a greater time interval to move the switch arm in an opposite direction for a relatively low outdoor temperature condition and a lesser time for relatively high outdoor temperature conditions.

The variable resistances 102 and 91 are provided to adjust the sensitivity of the potentiometer coils 48 and 101 so that the time interval required to move the switch arm 95 from one contact to another for a given outdoor temperature may be varied. The protective resistances 82 and 86 are provided to prevent burning up of the relay coils 77 and 78 should the slider 100 be moved to either extreme position with respect to the potentiometer coil 101.

An energizing coil is designated at 107 and a bucking coil is designated at 108. One end of the energizing coil 107 is connected by means of a wire 109 to the junction of wire 76 and the relay coil 77. A wire 110 connects the same end of the energizing coil 107 with one end of the bucking coil 108. The other end of the energizing coil 107 is connected by a wire 111 to the switch arm 95 and the other end of the bucking coil 108 is connected by a wire 112 to the contact 97. The contact 96 is connected by a wire 113 to the junction of wires 80 and 81. A wire 114 connects the junction of the energizing coil 107 and the wire 111 to a contact 115. A switch arm 116 cooperating with the contact 115 is connected by a wire 117 to the junction of wires 80, 81 and 113. A switch arm 118 cooperates with contacts 120 and 122 and a switch arm 119 cooperates with contacts 121 and 123.

When the switch arm 95 is moved into engagement with the contact 96 in the manner above described, a circuit is completed from the secondary 74 through wires 81 and 113, contact 96, switch arm 95, wire 111, energizing coil 107 and wires 109, 76 and 75 back to the secondary 74 to cause the relay coil 107 to move the switch arms 116, 118 and 119 into engagement with contacts 115, 120 and 121 respectively. When the switch arm 116 is moved into engagement with the contact 115 a holding circuit is completed from the secondary 74 through wires 81 and 117, switch arm 116, contact 115, wire 114, energizing coil 107 and wires 109, 76 and 75 back to the secondary 74 to maintain the switch arms 116, 118 and 119 in engagement with the contacts 115, 120 and 121. The switch arms will be maintained in this position until the switch arm 95 is moved out of engagement with the contact 96 and into engagement with the contact 97 in the manner above described. When the switch arm 95 is so moved into engagement with the contact 97, a circuit is completed from the secondary 74 through wires 81 and 117, switch arm 116, contact 115, wires 114 and 111, switch arm 95, contact 97, wire 112, bucking coil 108 and wires 110, 109, 76 and 75 back to the secondary 74. Completion of this circuit energizes the bucking coil 108 which neutralizes the action of the holding coil 107 to allow the switch arms 116, 118 and 119 to be moved out of engagement with the contacts 115, 120 and 121, respectively, and to allow the switch arms 118 and 119 to move into engagement with the contacts 122 and 123. This right hand movement of switch arms 116, 118 and 119 is accomplished by means of springs or gravity or other means (not shown).

Located outside of the building is an outdoor controller 124 which responds to outdoor atmospheric conditions including temperature, wind and solar radiation. This outside controller 124 comprises a block 125 enclosed within a weather-tight casing 126. Located within the block 125 by means of a post 128 is a bimetallic element 127 which responds to the temperature of the block 125. The bimetallic element 127 carries contacts 129 and 130 which are adapted to sequentially engage adjustable contacts 131 and 132. The controller 124 is also provided with a heater 133 for heating the block 125, the block 125 being cooled by the outdoor atmospheric conditions.

A primary 135 of a step-down transformer 136 having a secondary 137 is connected across the line wires 57 and 58. A relay coil is designated at 138 and controls the operation of switch arms 139, 140 and 141. Upon energization of the relay coil 138, the switch arms 139, 140 and 141 are moved into engagement with contacts 142, 143 and 144 respectively. Upon deenergization of the relay coil 138, the switch arms 139, 140 and 141 are moved out of engagement with the contacts 142, 143 and 144, respectively, and the switch arms 140 and 141 are moved into engagement with contacts 145 and 146, respectively, by means of springs, gravity or other means (not shown). One end of the secondary 137 is connected by means of a wire 147 to the adjustable contact 131. The other adjustable contact 132 is connected by means of a wire 148 and a wire 149 to one end of the relay coil 138. The other end of the relay coil 138 is connected by a wire 150 to the other end of the secondary 137. The switch arm 139 is connected by a wire 151 to the junction of wires 148 and 149. The contact 142 is connected by means of a wire 152 to the bimetallic element 127.

When the temperature of the block 125 of the outdoor controller 124 decreases below a predetermined value, the contact 129 engages contact 131. Upon a further decrease in the block temperature, the contact 130 engages the contact 132 to complete a circuit from the secondary 137, through wire 147, contacts 131, 129, 130 and 132, wires 148 and 149, relay coil 138 and wire 150 back to the secondary 137 to energize the relay coil 138 to move the switch arms 139, 140 and 141 into engagement with contacts 142, 143 and 144. When the switch arm 139 is so moved into engagement with the contact 142 a maintaining circuit is completed from the secondary 137 through wire 147, contacts 131 and 129, bimetallic element 127, wire 152, contact 142, switch arm 139, wires 151 and 149, relay coil 138 and wire 150 back to the secondary 137 to maintain the relay coil 138 energized. The relay coil 138 will remain energized by this maintaining circuit until the temperature of block 125 has risen to a sufficiently high value to break contact between the contacts 129 and 131 at which time the relay coil 138 will be deenergized to move the switch arm 139 out of engagement with the contact 142 and to move the switch arms 140 and 141 into engagement with the contacts 145 and 146.

The contact 120 is connected by a wire 153 to the switch arm 140. The contact 143 is connected by a wire 154 to the contact 30. The contact 145 is connected by wires 155 and 156 to the contact 31. The contact 122 is connected by a wire 157 to the junction of wires 155 and 156. The switch arm 118 is connected by wires 158 and 159 to one end of a secondary 206 of a step-down transformer 207 having a primary 208 connected across the line wires 57 and 58. The other end of the secondary 206 is connected by a wire 160 to one end of field 24. The other end of field 24 is connected by wires 161 and 162 to the contact arm 28. The contact arm 27 is connected by a wire 163 to the junction of wires 161 and 162. The contact 29 is connected by a wire 164 to the junction of wires 158 and 159.

With the parts in the position shown in the drawings, the valve 16 is opened supplying heat to the building, the outdoor controller 124 is satisfied and not calling for heat whereby the switch arm 140 is in engagement with contact 145, and the timing mechanism above described is positioned for night operation whereby the switch arm 118 is in engagement with the contact 122. Under these circumstances, a circuit is completed from the secondary 206, through wires 159 and 158, switch arm 118, contact 122, wires 157 and 156, contact 31, contact arm 28, wires 162 and 161, field 24 and wire 160 back to the secondary 206 to energize the field 24 to start the valve 16 toward its closed position. After the valve 16 has started this movement toward the closed position, the contact arm 27 is moved into engagement with the contact 29 to complete a maintaining circuit from the secondary 206, through wires 159 and 164, contact 29, contact arm 27, wires 163 and 161, field 24 and wire 160 back to the secondary 206 to complete the closing movement of the valve 16. When the valve 16 has been completely closed, the contact arm 27 is moved out of engagement with the contact 29 and the contact arm 28 has been moved into engagement with the contact 30 to position the valve motor for opening operation. In this manner, the supply of heating fluid to the building is shut off at night by the timing mechanism. In a manner to be pointed out hereafter, the heater 133 of the outdoor controller 124 is likewise shut off at night whereby both the building and the outdoor controller 124 are allowed to cool down at night in order to conserve on heating costs.

When the outdoor controller 124 has cooled down during the night, the contacts 129 and 130 are moved into engagement with the contacts 131 and 132 to energize the relay coil 138 to move the switch arms 140 and 141 into engagement with the contacts 143 and 144, respectively. The switch arms 140 and 141 will remain in this position throughout the night.

At some time in the morning depending upon the outdoor temperature, the switch arms 118 and 119 are moved into engagement with the contacts 120 and 121 by the timing mechanism in the manner pointed out above. Movement of switch arm 118 into engagement with contact 120 completes a circuit from the secondary 206 through wires 159 and 158, switch arm 118, contact 120, wire 153, switch arm 140, contact 143, wire 154, contact 30, contact arm 28, wires 162 and 161, field 24 and wire 160 back to the secondary 206 to start the valve 16 towards its open position. After the valve 16 has started to open contact arm 27 engages the contact 29 to complete a maintaining circuit from the secondary 206 through wires 159 and 164, contact 29, contact arm 27, wires 163 and 161, field 24 and wire 160 back to the secondary 206 to energize the field 24 and complete the opening movement of the valve 16. When the valve 16 has been fully opened, the contact arm 27 moves out of engagement with the contact 29 and the contact arm 28 moves into engagement with the contact 31 to position the valve motor for future closing movement. Therefore, at a time in the morning as determined by the outdoor temperature, the valve 16 is opened to supply heat to the building. When the temperature of the block 125 has been raised to a given value by the heater 133 in a manner to be pointed out hereafter, contact 129 disengages the contact 131 to deenergize the relay 138 to move the switch arm 140 into engagement with the contact 145 to complete a circuit from the secondary 206 through wires 159 and 158, switch arm 118, contact 120, wire 153, switch arm 140, contact 145, wires 155 and 156, contact 31, contact arm 28, wires 162 and 161, field 24 and wire 160 back to the secondary 206 to energize the field 24 to move the valve 16 to its closed position to prevent the further supply of heat to the building. Closing movement of the valve 16 is assured by the above referred to maintaining circuit.

Wires 165 and 166 connect the switch arm 119 to the line wire 57. The contact 121 is connected by a wire 167 to the switch arm 141. The contact 144 is connected by a wire 168 to one end of a primary 169 of a step-down transformer 170 having a secondary 171. The other end of the primary 169 is connected to the line wire 58. In the morning, the relay coil 138 is energized by reason of the night shut down to maintain the switch arm 141 in engagement with the contact 144 and at a given time in the morning as determined by the outdoor temperature the switch arm 119 is moved into engagement with the contact 121, in a manner pointed out above, to complete a circuit from the line wire 57 through wires 165 and 166, switch arm 119, contact 121, wire 167, switch arm 141, contact 144, wire 168 and primary 169 back to the line wire 58 to energize the transformer 170 to supply power to the secondary 171.

As seen in the lower right hand portion of the drawings, an energizing coil 172 and a bucking coil 173 are provided. The energizing coil 172 and the bucking coil 173 operate switch arms 174, 175 and 176 with respect to contacts 177, 180, 178, 179 and 181. Upon energization of the energizing coil 172, the switch arms 174, 175 and 176 are moved into engagement with the contacts 177, 178 and 179 respectively. Upon energization of the bucking coil 173 which neutralizes the action of the energizing coil 172, the switch arms 174, 175 and 176 are moved out of engagement with the contacts 177, 178 and 179 and the switch arms 174 and 176 are moved into engagement with the contacts 180 and 181 by means of springs or gravity or other means, not shown. The line wire 58 is connected by a wire 182 and a wire 183 to the contact 180. The switch arm 174 is connected by a wire 184 to one end of the energizing coil 172. The other end of the energizing coil 172 is connected by a wire 185 to the contact 123. The junction of wires 182 and 183 is connected by a resistance 186 and a wire 187 to the junction of wire 184 with the energizing coil 172. The junction of the energizing coil 172 with the wire 185 is connected by a wire 188 to the contact 178. The switch arm 175 is connected by a wire 189 to the junction of wires 165 and 166.

At night when the switch arm 119 is moved into engagement with the contact 123 in the manner above described, a circuit is completed from the line wire 58 through wires 182 and 183, contact 180, switch arm 174, wire 184, energizing coil 172, wire 185, contact 123, switch arm 119 and wires 166 and 165 back to the line wire 57 to energize the energizing coil 172 to move the switch arms 174, 175 and 176 into engagement with the contacts 177, 178 and 179, respectively. When the switch arm 175 moves into engagement with the contact 178, a holding circuit is completed from the line wire 58, through wire 182, resistance 186, wire 187, energizing coil 172, wire 188, contact 178, switch arm 175, and wires 189 and 165 back to the line wire 57 to maintain the energizing coil 172 energized regardless of the position of the switch arm 119 with respect to the contacts 121 and 123. The resistance 186 is provided in this maintaining circuit to prevent undue heating of the energizing coil 172.

One end of the bucking coil 173 is connected by a wire 190 to the contact 146 and the other end of the bucking coil 173 is connected by a wire 191 to the contact 177. When the temperature of the block 125 under the action of the heater 133 has risen to a predetermined value to break contact between the contacts 129 and 131 to deenergize the relay coil 138, the switch arm 141 is moved into engagement with the contact 146 to complete a circuit from the line wire 58 through wire 182, resistance 186, wires 187 and 184, switch arm 174, contact 177, wire 191, bucking coil 173, wire 190, contact 146, switch arm 141, wire 167, contact 121, switch arm 119, and wires 166 and 165 back to the line wire 57 to energize the bucking coil 173. Energization of the bucking coil 173 neutralizes the action of the holding coil 172 to move the switch arms 174, 175 and 176 to the right.

The contact 179 is connected by a wire 192 to a slider 193 cooperating with a resistance 194. Likewise, the contact 181 is connected by a wire 195 to a slider 196 cooperating with a resistance 197. The resistances 194 and 197 are connected together and to a wire 200 by means of wires 198 and 199. Wire 200 connects to an ammeter 201 which in turn is connected by a wire 202 to one end of the heater 133 located in the outdoor controller 124. The other end of the heater 133 is connected by a wire 203 to one end of the secondary 171 of the step-down transformer 170. The other end of the secondary 171 is connected by a wire 204 to the switch arm 176.

The resistances 194 and 197 are adjustable to determine the correct amount of energy supplied to the heater 133 and consequently the amount of heat delivered to the block 125. The resistance 197 controls the supply of heat to the block 125 during the day time and the resistance 194 controls the supply of heat to the block 125 during the morning pick-up period. When the secondary 171 of the step-down transformer 170 receives power in the above identified manner, and when the switch arm 176 is in engagement with the contact 181, heat is supplied to the block 125 for day operation and when the switch arm 176 is moved into engagement with the contact 179 heat is supplied to the block 125 for the morning pick-up period. As pointed out above and in the above referred to application, the amount of heat delivered to the block 125 during the day is proportional to the amount of heat delivered to the building as the heat loss of the block is to the heat loss of the building to maintain the temperature within the building at a constant normal day value. The amount of heat so delivered to the block 125 during the day is adjusted and visually indicated by the variable resistance 197 and the ammeter 201.

However, during night operation, the outdoor controller 124 is rendered inoperative and the temperatures of the building and of the outdoor controller are allowed to drop, the temperature of the controller will drop farther than the temperature of the building during this night shut-off period. In order to bring the temperature of the building and of the outdoor controller back up to normal during the morning pick-up period, to place the system in condition for normal day operation, a definite amount of heat must be supplied to the outdoor controller. Assume that the temperature of the building drops to say, 60°, and that of the outdoor controller drops to say 20° at night, and that a normal average temperature of 70° is to be maintained in the building and in the controller during the day time, the amounts of heat delivered to the controller and to the building should be so proportional that when the heating system is turned on in the morning for the morning pick-up period, the temperature of the building and the temperature of the outdoor controller should reach their normal day values at substantially the same time. In order to set up and maintain this proportion of heat, the variable resistance 194 is provided for the morning pick-up cycle. The proper amount of heat delivered to the outdoor controller 124 during this morning pick-up cycle may vary with conditions such as the amount of radiation in the building, the heat losses from the building and the controller, and the capacity of the building and the controller to hold heat. By trial on each particular installation, the correct setting of the variable resistance 194 may be obtained.

Summarizing the operation of the total system as shown in Fig. 1, it is assumed that the parts are in position for night operation. The building is therefore cold and the outdoor controller 124 is also cold. The relay coil 138 is energized maintaining the switch arms 139, 140 and 141 to the left. The energizing coil 172 is energized maintaining the switch arms 174, 175 and 176 to the left. The time switch is at a position corresponding to midnight and the slider 47 of the timing motor is in its extreme downward position causing switch arm 95 to engage contact 97. The switch arms 116, 118 and 119 are positioned to the right and the valve 16 is closed. At substantially 6:00 in the morning, the time switch places the timing motor in operation. At some time between 6:00 and 8:30, as determined by the outside controller 98 in accordance with outdoor atmospheric conditions, the switch arm 95 is moved into engagement with the contact 96 to move the switch arms 116, 118 and 119 to the left to cause opening of the valve 16 to supply heat to the building. At the same time the valve 16 is opened, the transformer 170 is energized to supply heat to the outdoor controller 124 under the control of the morning pick-up resistance 194. Heat will be supplied to the building and the controller in this manner and at substantially 8:30 in the morning the temperature of the building and the temperature of the block 125 will rise to their normal day values.

When the block temperature 125 has risen to its normal value, contact between the contacts 129 and 131 is broken to deenergize the relay coil 138 and move the switch arms 139, 140 and 141 to the right. This causes closing movement of the valve which prevents the further supply of heat to the building and also causes deenergization of the transformer 170 to prevent the further supply of heat to the outdoor controller. At the same time, the bucking coil 173 is energized to neutralize the action of the holding coil 172 to move the switch arms 174, 175 and 176 to the right to place the day resistance 197 in control of the supply of heat to the outdoor controller.

When the block 125 of the outdoor controller 124 has been cooled by the outdoor atmospheric conditions, the relay coil 138 is energized to move the switch arms 139, 140 and 141 to the left to open the valve 16 to supply heat to the building again and to energize the transformer 170 to supply heat to the outdoor controller under the control of the day resistance 197. When the temperature of the outdoor controller is again brought back up to normal, the relay coil 138 is deenergized to move the switch arms 139, 140 and 141 to the right to close the valve 16 to prevent the further supply of heat to the building and to deenergize the transformer 170 to prevent the further supply of heat to the outdoor controller 124.

In this manner, heat will be supplied to the building throughout the day under the command of the outdoor controller 124 to maintain a normal day temperature within the building.

At substantially 6:00 in the evening, the time switch causes operation of the timing motor to move the slider 47 downwardly with respect to the potentiometer coil 48. At some time between 6:00 and 8:30 in the evening, as determined by the outdoor temperature, the switch arm 95 will be moved to the right into engagement with the contact 97 to move the switch arms 116, 118 and 119 to the right. This causes closing of the valve 16 and prevents the further supply of heat to the building for the remainder of the night. This also causes deenergization of the transformer 170 to prevent the supply of heat to the outdoor controller 124 for the remainder of the night whereby the building and the outdoor controller 124 are allowed to cool.

When the outdoor controller has cooled sufficiently, the relay coil 138 is energized to move the switch arms 139, 140 and 141 to the left to energize the energizing coil 172 to move the switch arms 174, 175 and 176 to the left to place the control of the supply of heat to the outdoor controller 124 under the command of the morning pick-up resistance 194 so that at 6:00 the following morning, the above cycle of operation may be repeated.

Due to the use of the novel timing motor when operated in conjunction with the outdoor controller 98, it is possible to place the heating system in operation at a time in the morning which is determined according to outdoor temperatures. As pointed out above, when the outdoor temperature is relatively low, the heating system is placed in operation relatively early and when the outdoor temperature is relatively high, the heating system is placed in operation relatively late so that the temperature of the building and the outdoor controller are brought up to the normal day value at substantially the same time every morning regardless of the outdoor temperature. Likewise, the heating system is placed out of operation at night time relatively early when the outdoor temperature is relatively high and relatively late when the outdoor temperature is relatively low.

Figure 2:
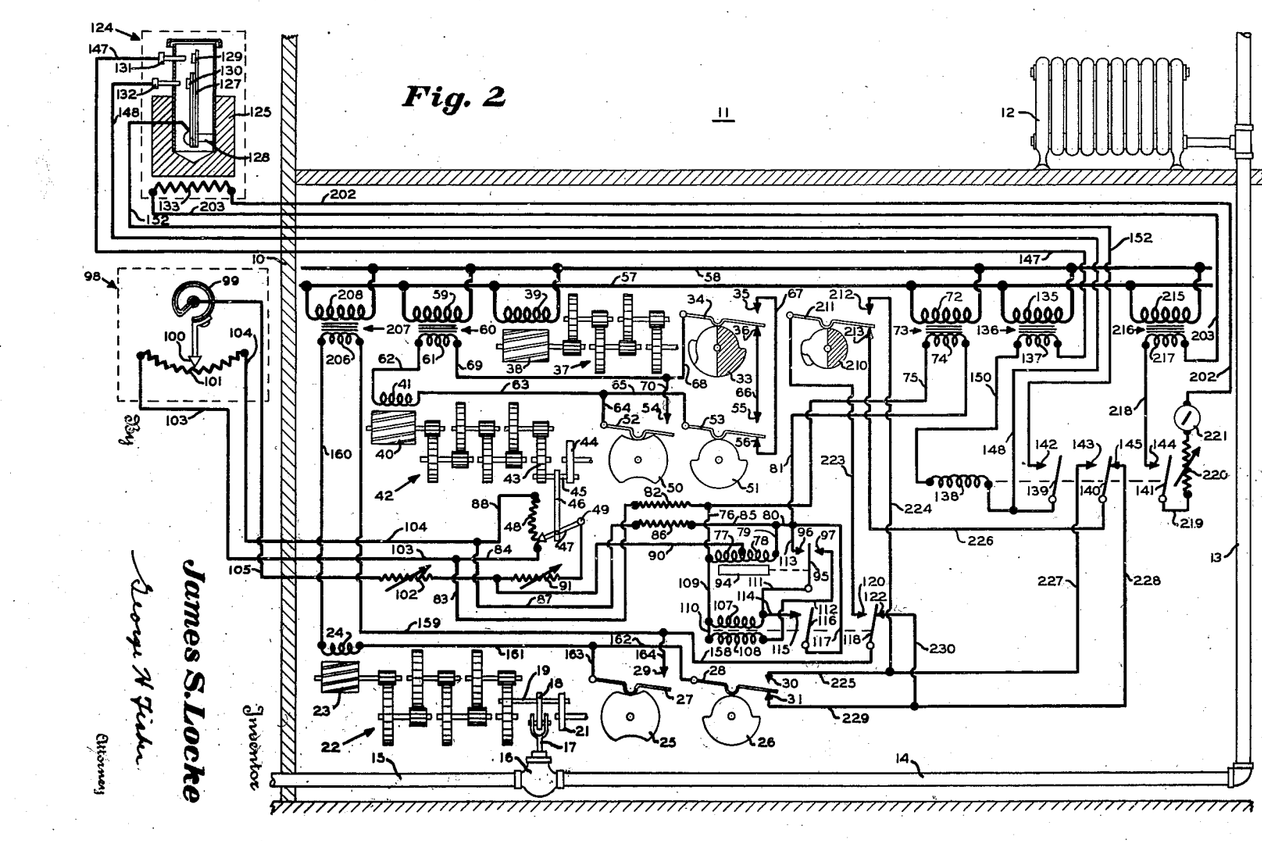
Fig. 2 is a diagrammatic illustration of another form of my invention wherein the morning pick-up period and the time of the beginning of the morning pick-up period is controlled by one outdoor controller and wherein the normal day operation is controlled by another outdoor controller.

Referring now to Fig. 2, another form of my invention is shown as applied to a building having a side wall 10 and a plurality of spaces to be heated 11. Each space to be heated is provided with a radiator 12 which receives its supply of heating fluid from some source, not shown. The supply of heating fluid is controlled by a valve 16 in identically the same manner as shown in Fig. 1 and like reference characters have been used. This form of the invention also contemplates the use of the outdoor controller 124 for controlling the relay coil 138 which in turn controls the operation of switch arms 139, 140 and 141. The operation of switch arms 139, 140 and 141 by the outdoor controller 124 of this modification is the same as that of the modification shown in Fig. 1 and like reference characters have been used. The only distinction in this construction in the two modifications is that the contact 146 engageable by the switch arms 141 has been omitted in the modification shown by Fig. 2.

The outdoor controller 98 and the timing motor for operating the switch arm 95 between the contacts 96 and 97 as disclosed in Fig. 1 is used in the modification shown by Fig. 2 and like reference characters have been used to designate the various elements. As in Fig. 1, the switch arm 95 controls the operation of an energizing coil 107 and a bucking coil 108 to operate switch arms 116 and 118 in exactly the same manner as in Fig. 1.

The time switch for placing the timing motor in operation is the same as in Fig. 1 with the exception that the timing switch carries a second cam 210 which is adapted to operate a contact arm 211 between contacts 212 and 213. When the high dwell of the cam 210 engages the contact arm 211, the contact arm 211 is moved into engagement with the contact 212. When the high dwell of the cam 210 is moved out of engagement with the contact arm 211, the contact arm 211 moves into engagement with the contact 213.

A primary 215 of a step-down transformer 216, having a secondary 217 is connected across the line wires 57 and 58. One end of the secondary 217 is connected by a wire 218 to the contact 144. The switch arm 141, cooperating with the contact 144, is connected by a wire 219 to a variable resistance 220 which is in turn connected to an ammeter 221. The ammeter 221 is connected by a wire 202 to one end of the heater 133 located in the outdoor controller 124. The other end of the heater 133 is connected by the wire 203 to the other end of the secondary 217. When the relay 138 is energized upon the existence of a predetermined low temperature in the outdoor controller 124, the switch arm 141 is moved into engagement with the contact 144 to complete a circuit from the secondary 217 of the step-down transformer 216 through wire 218, contact 144, switch arm 141, wire 219, variable resistance 220, ammeter 221, wire 202, heater 133, and wire 203 back to the secondary 217. Completion of this circuit causes heating of the block 125 and the amount of heat supplied to the block 125 may be regulated by the variable resistance 220. Upon deenergization of the relay coil 138, the above circuit is broken and the further supply of heat to the outdoor controller 124 is prevented.

The contact arm 211 of the time switch is connected by a wire 223 to the contact 120 associated with the switch arm 118 which is operated by the energizing coil 107 and the bucking coil 108. The contact 212 of the time switch is connected by means of wires 224 and 225 to the contact 30 of the valve motor. The contact 213 of the time switch is connected by a wire 226 to the switch arm 140 which is controlled by the relay coil 138. The contact 143 associated with the switch arm 140 is connected by a wire 227 to the junction of wires 224 and 225. The other contact 145 associated with the switch arm 140 is connected by wires 228 and 229 to the contact 31 of the valve motor. The contact 122 associated with the switch arm 118 is connected by a wire 230 to the junction of wires 228 and 229.

For purposes of illustration, the cam 33 is shown to move the switch arm 34 upwardly at substantially 5:30 a. m. and downwardly at substantially 6:00 p. m. The cam 210 is shown to raise the contact arm 211 upwardly at substantially 5:30 a. m. and downwardly at substantially 8:00 a. m.

Assume the parts in the position for night operation, the time switch maintains the contact arms 34 and 211 in engagement with the contacts 36 and 213, respectively. The switch arms 116 and 118 are out of engagement with the contacts 115 and 120 and the switch arm 118 is in engagement with the contact 122 to maintain the valve 16 in its closed position to prevent the supply of heating fluid to the building at night. When the temperature of the outdoor controller 124 drops below a predetermined value the relay coil 138 is energized to move the switch arms 139, 140 and 141 to the left and when switch arm 141 engages the contact 144, heat is supplied to the outdoor controller 124. When the temperature of the outdoor controller 124 rises above a predetermined value by reason of this supply of heat, the relay coil 138 is deenergized to move the switch arms 139, 140 and 141 to the right thereby preventing the further supply of heat to the outdoor controller 124. In this manner, the temperature of the outdoor controller 124 is maintained at a normal value throughout the night as well as the day.

At substantially 5:30 a. m. the time switch moves the contact arms 34 and 211 into engagement with the contacts 35 and 212, respectively. Movement of the contact 34 into engagement with the contact 35 causes operation of the timing motor to move the slider 47 upwardly across the potentiometer coil 48. This movement of the slider 47 across the potentiometer coil 48 causes movement of the switch arm 95 into engagement with the contact 96 at some time subsequent to 5:30 a. m. as determined by the outdoor controller 98 in the manner pointed out above. If the outdoor temperature is relatively cold, the switch arm 95 will be moved into engagement with contact 97 relatively early and if the outdoor temperature is relatively high, the switch arm 95 will be moved into engagement with the contact 96 relatively late. When the switch arm 95 is thus moved into engagement with the contact 96 the energizing coil 107 is energized to move the switch arms 116 and 118 into engagement with the contacts 115 and 120, respectively. Movement of the switch arm 116 into engagement with the contact 115 completes a maintaining circuit in the manner above described to maintain the energizing coil 107 energized throughout the day.

Since the contact arm 211 is moved into engagement with the contact 212, movement of the switch arm 118 into engagement with the contact 120 completes a circuit from the secondary 206 of the step-down transformer 207 through wires 159 and 158, switch arm 118, contact 120, wire 223, contact arm 211, contact 212, wires 224 and 225, contact 30, contact arm 28, wires 162 and 161, field 24 and wire 160 back to the secondary 206 to cause opening movement of the valve 16. In this manner, heating fluid is supplied to the radiators 12 in the building at a time determined by the prevailing outdoor temperature.

At substantially 8:30 a. m., at which time the building temperature will be restored to its normal day value, the contact arm 211 is moved into engagement with the contact 213 to complete a circuit from the secondary 206 of the step-down transformer 207, through wires 159 and 158, switch arm 118, contact 120, wire 223, contact arm 211, contact 213 and wire 226 to the switch arm 140 controlled by the relay coil 138. If the outdoor controller 124 is calling for heat the relay coil 138 is energized to move the switch arm 140 into engagement with the contact 143 which completes a circuit through the contact 30 of the valve motor to open the valve 16 to supply heat to the building. If the outdoor controller 124 is satisfied, the relay coil 138 is deenergized and the switch arm 140 moves into engagement with the contact 145 to complete a circuit through the contact 31 of the valve motor to move the valve 16 to a closed position. In this manner, the temperature within the building is maintained constant throughout the day according to outdoor temperature conditions.

At substantially 6:00 p. m., the time switch moves the contact arm 34 into engagement with the contact 36 to cause operation of the timing motor to move the slider 47 from its upper position on the potentiometer coil 48 to its lower position. Downward movement of the slider 47 causes movement of the switch arm 95 into engagement with the contact 97 at a time determined by the outdoor controller 98 in the manner pointed out above. When the outdoor temperature is relatively cold, the switch arm 95 is moved into engagement with the contact 97 relatively late and when the outdoor temperature is relatively warm, the switch arm 95 is moved into engagement with the contact 97 relatively early. Movement of the switch arm 95 into engagement with the contact 97 causes energization of the bucking coil 108 which neutralizes the action of the energizing coil 107 and moves the switch arm 118 into engagement with the contact 122. Movement of the switch arm 118 into engagement with the contact 122 completes a circuit through the contact 31 of the valve motor to cause closing movement of the valve 16 to prevent the further supply of heating fluid to the building and therefore, the building is allowed to cool down during the night.

The relay coil 138 is intermittently energized and deenergized by the outdoor controller 124 to maintain the temperature of the outdoor controller 124 normal during the night, but since the switch arm 118 is out of engagement with the contact 120 during the night, no circuit can be completed through the switch arm 140 controlled by the relay 138 and therefore energization of the relay 138 cannot cause opening movement of the valve 16.

From the above, it is seen that I have provided in this modification a means for supplying heat to a building independent of the normal day controller to bring the temperature of the building to normal after a night shut-down. I have also provided in this modification a means for varying the beginning of the morning pick-up period according to outdoor temperature conditions so that on cold mornings the heating system is placed in operation earlier than on warm mornings so that the building will be brought up to its normal temperature at substantially the same time every morning. In a like manner, the heating system is turned off at night according to outdoor temperatures so that when it is relatively cold outside, the heating system is turned off relatively late and when the temperature outside is relatively warm, the heating system is turned off relatively early.

Although for purposes of illustration I have set forth certain times at which the system will be placed in operation and at which the system will be placed out of operation, I do not intend to be so limited since any sequence of operation desired may be had within the contemplation of this invention. Although I have disclosed two forms of my invention for purposes of illustration, I do not intend to be limited thereby but intend to be limited only by the scope of appended claims and the prior art.

I claim:

1. In a system of the class described, temperature changing means for a building, control means for controlling said temperature changing means including means for maintaining the temperature of the building normal and means for restoring the temperature of the building to normal after the temperature has been allowed to deviate from normal, and time means including temperature responsive means for rendering said control means effective at a time dependent upon outdoor temperature conditions.

2. In a system of the class described, temperature changing means for a building, control means for controlling said temperature changing means including means for maintaining the temperature of the building normal and means for restoring the temperature of the building to normal after the temperature has been allowed to deviate from normal, and time means including temperature responsive means for rendering said control means effective at a time dependent upon outdoor temperature conditions to restore the temperature of the building to normal at the same time regardless of outdoor temperature conditions.

3. In a system of the class described, temperature changing means for a building, control means for controlling said temperature changing means including means for maintaining the temperature of the building normal and means for restoring the temperature of the building to normal after the temperature has been allowed to deviate from normal, and time means including temperature responsive means for rendering said control means effective at a time dependent upon outdoor temperature conditions, to restore the temperature of the building to normal at the same time regardless of outdoor temperature conditions and to maintain the temperature of the building normal thereafter.

4. In a system of the class described, temperature changing means for a building, an outdoor controller for controlling said temperature changing means, and means including time means and temperature responsive means for rendering said controller effective at a time dependent upon outdoor temperature conditions and ineffective at a time depending upon outdoor temperature conditions.

5. In a system of the class described, temperature changing means for a building, control means including a controller having temperature changing means and temperature responsive means, the temperature responsive means controlling both temperature changing means, and means including time means and temperature responsive means for rendering said control means effective at a time dependent upon outdoor temperature conditions and ineffective at a time depending upon outdoor temperature conditions.

6. In a system of the class described, temperature changing means for a building, a controller having temperature changing means and temperature responsive means, the temperature responsive means controlling both temperature changing means to maintain a normal temperature within the building and to restore the building temperature to normal after the building temperature has been allowed to deviate from normal, and time means including temperature responsive means for rendering said controller effective at a time dependent upon outdoor temperature conditions.

7. In a system of the class described, temperature changing means for a building, a controller having temperature changing means and temperature responsive means, the temperature responsive means controlling both temperature changing means to maintain a normal temperature within the building and to restore the building temperature to normal after the building temperature has been allowed to deviate from normal, and time means including temperature responsive means for rendering said controller effective at a time dependent upon outdoor temperature conditions to restore the temperature of the building to normal at the same time regardless of outdoor temperature conditions.

8. In a system of the class described, temperature changing means for a building, a controller for controlling normally the temperature changing means, and means for controlling the temperature changing means independently of the controller to restore the temperature of the building to normal at a given time each day regardless of outdoor temperature conditions.

9. In a system of the class described, temperature changing means for a building, a controller for controlling normally the temperature changing means, means for controlling the temperature changing means independently of the controller to restore the temperature of the building to normal at a given time each day regardless of outdoor temperature conditions, and means to shift the control of the temperature changing means from the means to the controller.

10. In a system of the class described, temperature changing means for a building, a temperature responsive controller for controlling normally the temperature changing means to maintain a normal temperature within the building, and time and temperature responsive means for rendering the temperature responsive controller inoperative to control the temperature changing means at a time dependent upon outdoor temperature conditions, to restore the temperature of the building to normal and to render the temperature responsive controller operative to control the temperature changing means.

11. In a system of the class described, temperature changing means for a building, an outdoor controller for controlling said temperature changing means, and means including time means and temperature responsive means for operating said temperature changing means at a time dependent upon outdoor temperature conditions and for placing the temperature changing means under the control of the outdoor controller at a predetermined subsequent time.

12. In a system of the class described, temperature changing means for a building, a controller having temperature changing means and temperature responsive means, the temperature responsive means controlling the controller temperature changing means and being adapted to control the building temperature changing means to maintain a normal temperature within the building, and time means including temperature responsive means for operating said building temperature changing means at a time dependent upon outdoor temperatures and for placing the building temperature changing means under the control of the controller temperature responsive means at a predetermined subsequent time.

13. In a system of the class described, temperature changing means for a building, temperature responsive means for controlling said temperature changing means, and means for placing said temperature changing means in operation at a variable time dependent upon a condition including a coil associated with the temperature changing means, a variable resistance varied at predetermined times and a variable resistance varied in response to changes in a condition, both of said variable resistances controlling the energization of said coil.

14. In a system of the class described, temperature changing means for a building, temperature responsive means for controlling said temperature changing means, and means for placing said temperature changing means in operation at a time dependent upon outdoor temperatures including a coil associated with the temperature changing means, a variable resistance varied at predetermined times and a variable resistance varied in accordance with variations in outdoor temperatures.

15. In a system of the class described, temperature changing means for a building, a controller having temperature changing means and temperature responsive means, the temperature responsive means controlling both temperature changing means, and means for placing both temperature changing means in operation at a time dependent upon outdoor temperatures including a coil associated with both temperature changing means, a variable resistance varied at predetermined times and a variable resistance varied in accordance with variations in outdoor temperatures.

16. In a system of the class described, temperature changing means for a building, a controller having temperature changing means and temperature responsive means, the temperature responsive means controlling both temperature changing means, means for placing the building temperature changing means in operation at a time dependent upon outdoor temperatures including a coil associated with the building temperature changing means, a variable resistance varied at predetermined times and a variable resistance varied in accordance with variations in outdoor temperatures, and time means for placing the building temperature changing means under the control of the controller.

17. In a system of the class described, temperature changing means for a building, a controller for controlling said temperature changing means, and means including time means and temperature responsive means for operating said temperature changing means independently of said controller at a time dependent upon outdoor temperature conditions and for placing the temperature changing means under the control of the controller at a predetermined subsequent time.

JAMES S. LOCKE.